United States Patent
Moller et al.

(10) Patent No.: US 7,293,419 B1
(45) Date of Patent: Nov. 13, 2007

(54) REFRIGERANT TRANSFER SYSTEM AND METHOD

(75) Inventors: Larry G. Moller, Harvard, IL (US); Dean P. Pfefferle, Elgin, IL (US)

(73) Assignee: Snap-On Incorporated, Pleasant Prairie, WI (US)

( * ) Notice: Subject to any disclaimer, the term of this patent is extended or adjusted under 35 U.S.C. 154(b) by 197 days.

(21) Appl. No.: 10/936,497

(22) Filed: Sep. 9, 2004

Related U.S. Application Data

(60) Provisional application No. 60/574,577, filed on May 27, 2004.

(51) Int. Cl.
*F25B 45/00* (2006.01)

(52) U.S. Cl. .............. 62/77; 62/149; 62/292

(58) Field of Classification Search .......... 62/77, 62/149, 292, 222, 511, 475; 236/92 B; 251/30.03, 251/45
See application file for complete search history.

(56) References Cited

U.S. PATENT DOCUMENTS

| | | | | | |
|---|---|---|---|---|---|
| 3,538,961 | A | * | 11/1970 | Bruce | 141/61 |
| 3,873,289 | A | * | 3/1975 | White | 62/149 |
| 4,624,112 | A | * | 11/1986 | Proctor | 62/149 |
| 4,998,413 | A | * | 3/1991 | Sato et al. | 62/149 |
| 5,201,188 | A | * | 4/1993 | Sakuma | 62/149 |
| 5,758,506 | A | * | 6/1998 | Hancock et al. | 62/77 |
| 5,806,328 | A | * | 9/1998 | Muston et al. | 62/149 |
| 5,934,091 | A | * | 8/1999 | Hanson et al. | 62/149 |
| 5,999,700 | A | * | 12/1999 | Geers | 392/441 |
| 6,134,896 | A | * | 10/2000 | Brown et al. | 62/149 |
| 6,141,977 | A | * | 11/2000 | Zugibe | 62/292 |
| 6,158,234 | A | * | 12/2000 | Szutu | 62/292 |
| 6,360,554 | B1 | * | 3/2002 | Trachtenberg | 62/292 |
| 6,385,986 | B1 | * | 5/2002 | Ferris et al. | 62/292 |
| 6,446,453 | B1 | * | 9/2002 | Trachtenberg | 62/292 |
| 6,449,962 | B1 | * | 9/2002 | Takemasa et al. | 62/77 |
| 6,481,221 | B2 | * | 11/2002 | Ferris et al. | 62/77 |
| 6,609,385 | B1 | * | 8/2003 | Ferris et al. | 62/77 |
| 6,996,998 | B2 | * | 2/2006 | Lifson et al. | 62/149 |

FOREIGN PATENT DOCUMENTS

JP 2002-39648 A * 2/2002

* cited by examiner

*Primary Examiner*—Mohammad M. Ali
(74) *Attorney, Agent, or Firm*—McDermott Will & Emery LLP

(57) ABSTRACT

A refrigerant recovery/recycling system includes a source container fluidly connected to a recovery/recycling device via a vaporizer. Liquid refrigerant is introduced into the vaporizer via the source container and the vaporizer changes the refrigerant from a liquid into a vapor. In so doing, slow/no flow conditions of both the source container and the recovery/recycling device can be reduced, which increases the rate in which the recovery/recycling device is charged with refrigerant.

14 Claims, 3 Drawing Sheets

REFRIGERANT TRANSFER SYSTEM AND METHOD

CROSS REFERENCE TO RELATED APPLICATIONS

This application claims priority to U.S. Provisional Application No. 60/574,577, filed May 27, 2004, which is incorporated herein by reference in its entirety.

TECHNICAL FIELD

The disclosure relates generally to refrigerant charging systems and, more specifically, to an improved transfer system for refrigerant recovery/recycling equipment.

BACKGROUND ART

An example of a conventional refrigerant recovery/recycling system 11 is illustrated in FIG. 1. The refrigerant recovery/recycling system 11 includes a source container 12 directly connected to a recovery/recycling device 22 via a line 16. Typically, a recovery/recycling device 22 is preconditioned and replenished with refrigerant used for charging by drawing refrigerant into the device from vapor phase refrigerant 20 in the source container 12. This causes the source container 12 to reduce in pressure and thereby chill substantially the source container 12.

This method of replenishing the recovery/recycling device 22 is slow due to low pressure as a result of the chilling effect of depletion of the source refrigerant vapor. If liquid refrigerant 18 is drawn directly into the recovery/recycling device 22, various components within the recovery/recycling device 22 will become sluggish due to the liquid refrigerant, which again slows the transfer of refrigerant to the recovery/recycling device 22. Furthermore, if sufficient liquid is drawn into the recovery/recycling device 22, a compressor powering the recovery/recycling device 22 may fail. There is, therefore, a need for a refrigerant recovery/recycling system that prevents chilling and slowed/stopped flow from the source container to the recovery/recycling device to improve the rate of charging of the recovery/recycling device.

SUMMARY OF THE DISCLOSURE

Described is a system for charging a refrigerant recovery/recycling system with refrigerant. The system includes a source container fluidly connected to a recovery/recycling device via a vaporizer. Liquid refrigerant is introduced into the vaporizer via the source container and the vaporizer changes the refrigerant from a liquid into a vapor. In so doing, reduced flow of both the source container and the recovery/recycling device can be avoided, which increases the rate in which the recovery/recycling device is charged with refrigerant.

In one aspect, the refrigerant recovery/recycling system, comprises a source container for storing refrigerant, a recovery/recycling device, and a vaporizer disposed between and fluidly connected to the source container and the recover/recycling device. In other aspects, the vaporizer may comprise a thermal expansion valve, regulator, a pulsed solenoid, or an orifice.

In another aspect, a method for charging a recovery/recycling device with refrigerant is provided and comprises the steps of transferring liquid refrigerant from a source container to a vaporizer separate from said source container, vaporizing the liquid refrigerant using the vaporizer, and transferring the vaporized refrigerant from the vaporizer to the recovery/recycling device. In further aspects of this method, the transferring and vaporizing steps may utilize a vaporizer comprising a thermal expansion valve, a regulator, a pulsed solenoid, or an orifice.

Additional advantages will become readily apparent to those skilled in the art from the following detailed description, wherein only an exemplary embodiment of the present invention is shown and described, simply by way of illustration of the best mode contemplated for carrying out the present invention. As will be realized, the disclosure is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE PREFERRED EMBODIMENT

Figure 1:
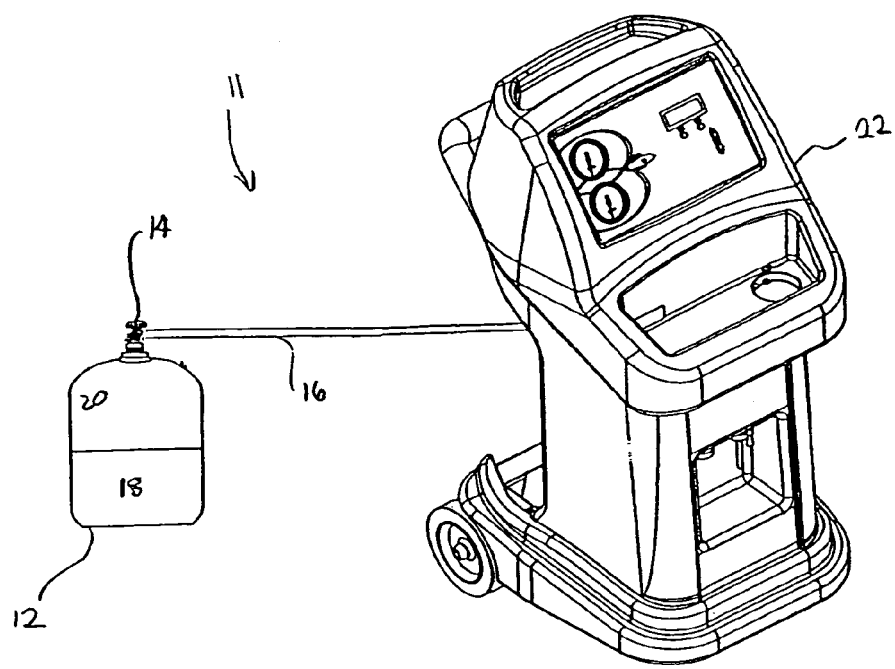
FIG. 1 is a schematic view of a conventional refrigerant recovery/recycling system.
Figure 2:
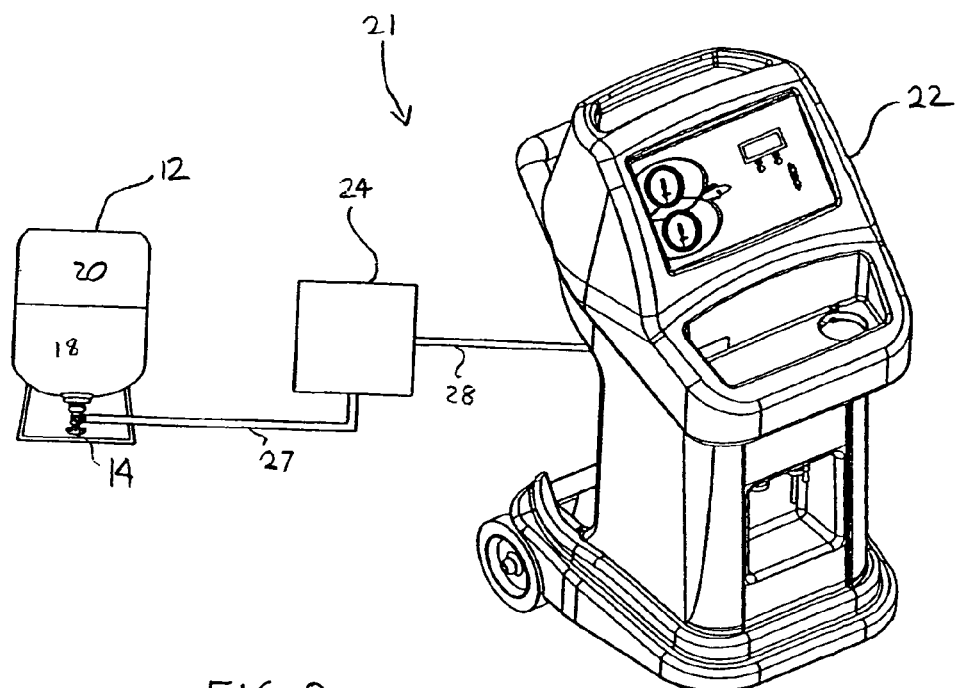
FIG. 2 is a schematic view of a refrigerant recovery/recycling system according to the disclosure.
Figure 4:
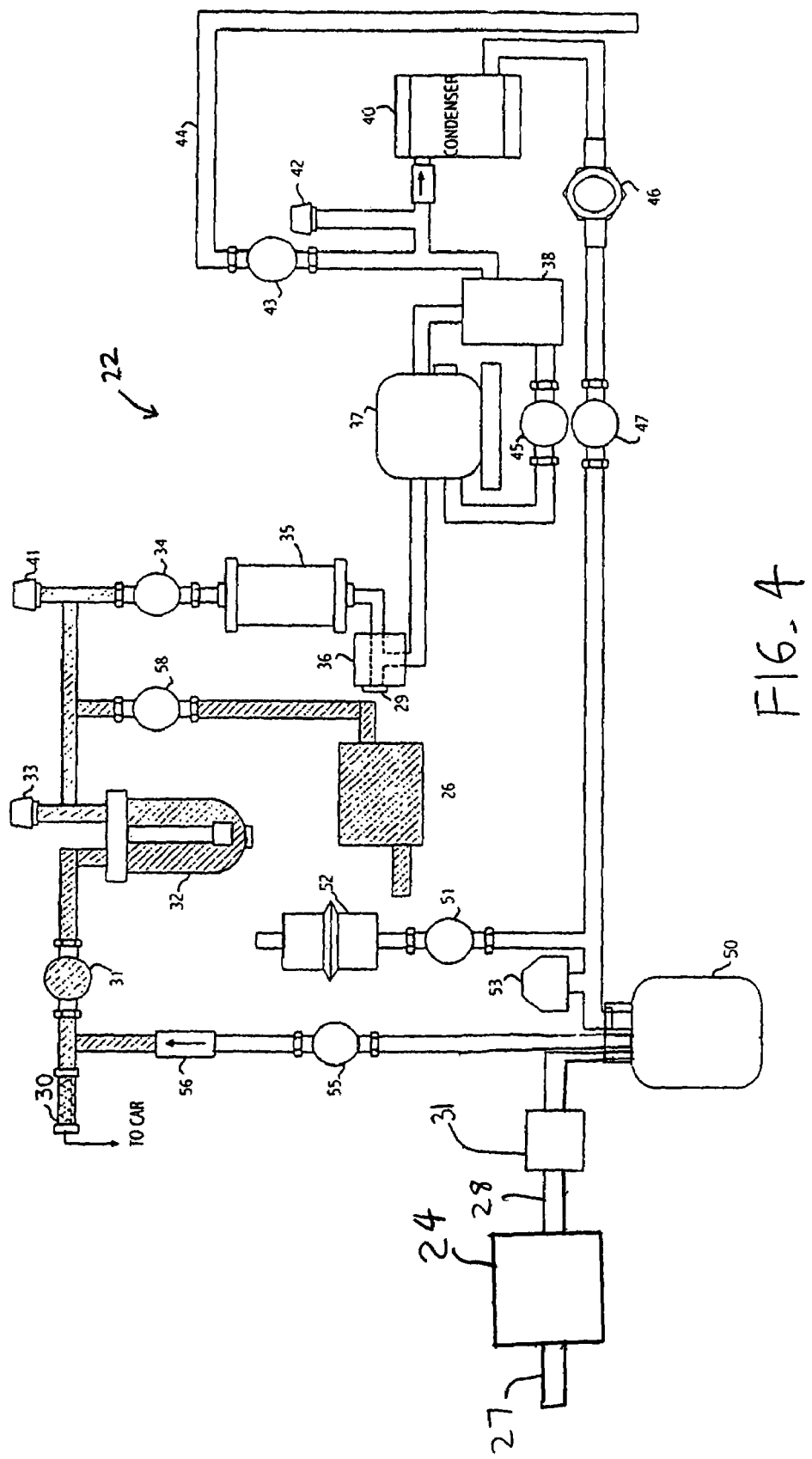
FIG. 4 is schematic new view of a recovery/recycling device according to a further embodiment of the invention.

An example of a refrigerant recovery/recycling system 21 is illustrated in FIG. 2. The refrigerant recovery/recycling system 21 includes a source tank 12 connected to a recovery/recycling device 22 via a vaporizer 24. The vaporizer 24 is fluidly connected to the source tank 12 with a first line 27 and the vaporizer 24 is fluidly connected to the recovery/recycling device 22 with a second line 28. Although shown in FIG. 2 as being positioned away from the recovery/recycling device 22, the vaporizer 24 can be positioned within the recover/recycling device 22, as shown in FIG. 4.

The first line 27 can be connected to the source tank 12 at any location. However, in a current aspect of the refrigerant recovery/recycling system 21, the first line 27 is connected to the source tank 12 so as to draw liquid refrigerant 18 from the source tank 12. In this particular instance, the liquid refrigerant 18 is drawn off the bottom of the source tank 12.

Although vaporized refrigerant 20 can be drawn from the source tank 12, By drawing off liquid refrigerant 18 from the source tank 12, the aforementioned reduction in pressure in the source tank 12 is reduced. Unlike a conventional system in which the reduction in pressure in the source tank 12 decreases the temperature of the source tank 12, by maintaining the substantially same pressure within the source tank 12 using the present refrigerant recovery/recycling system 21, the temperature of the source tank 12 remains substantially the same, thereby preventing the problems of low/no flow rate components, such as a tank valve 14, within the source tank 12 due to low-temperature refrigerant.

Upon entering the vaporizer 24 from the first line 27, the liquid refrigerant is substantially completely vaporized. Any type of device capable of vaporizing a liquid refrigerant is acceptable for use with the refrigerant recovery/recycling system 21. For example, the vaporizer may be a thermal expansion valve, regulator, pulsed solenoid, orifice, or a combination thereof. Although shown being separate from the recovery/recycling device 22, the vaporizer 24 may be incorporated within the recovery/recycling device 22.

When the liquid refrigerant is vaporized using the vaporizer 24, a reduction in pressure of the refrigerant occurs. However, because the vaporization occurs away from the source tank 12, the problems associated with the components in the source tank 12 being chilled by low-temperature refrigerant can be reduced. The vaporized refrigerant is then transferred to the recovery/recycling device 22 via the second line 28.

Figure 3:
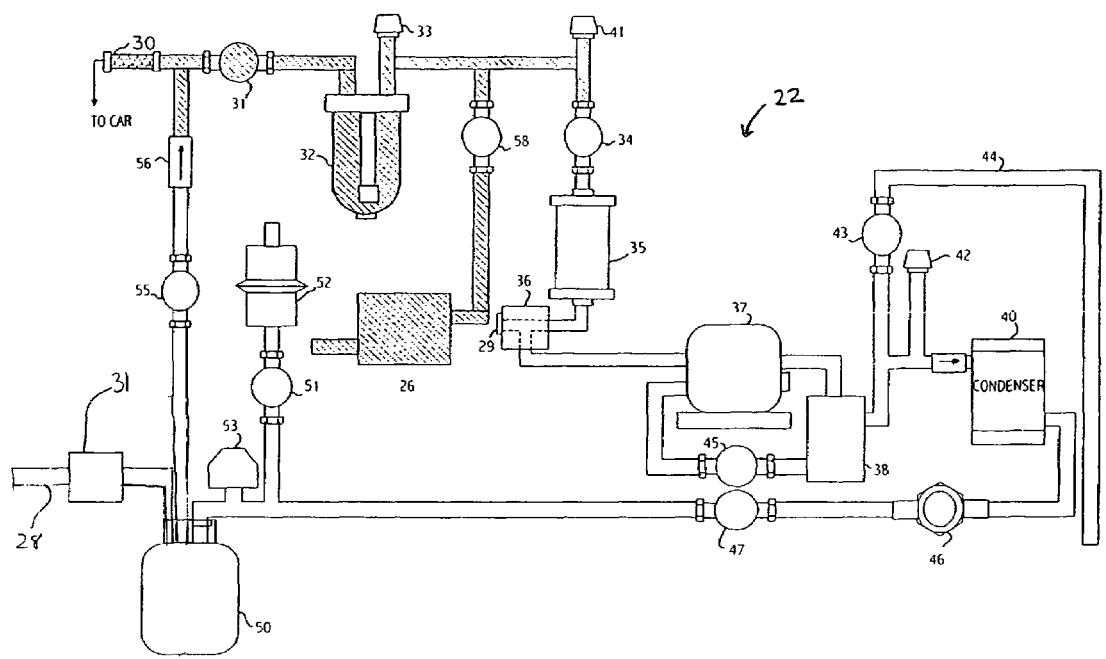
FIG. 3 is a schematic view of a recovery/recycling device.

An example of a refrigerant recovery/recycling device 22 is illustrated in FIG. 3. A refrigerant recovery/recycling device for recovering/recycling refrigerant from a refrigeration system and a charging the refrigeration system with refrigerant is known in the art, and any refrigerant recovery/recycling device so capable is acceptable for use with the refrigerant recovery/recycling system 21. For example, a refrigerant recovery/recycling device is illustrated and described in U.S. Pat. No. 6,427,457 to Pfefferle et al., incorporated herein by reference.

To withdraw refrigerant from the tank 12, a compressor 37 creates a pressure differential between the recycling/recharging device 22 to draw liquid from the tank 12, through the lines 27, 28 and the vaporizer 24 and into the recycling/recharging device 22. Upon entering the recycling/recharging device 22, the refrigerant is stored in a refrigerant recovery tank 50.

The recycling/recharging device 22 is also adapted to be connected to the air-conditioning system of an automotive vehicle (not shown) using a connector 30. The connector 30 is coupled through a suitable filter and a vacuum solenoid valve 31 to an oil separator 32 for removing oil from the refrigerant, and the output of the oil separator 32 is in turn connected to a vacuum switch 33 and, through an oil separator solenoid valve 34, to a master filter/dryer 35. The output of the master filter/dryer 35 is connected through a manifold 36 to the suction port of a compressor/pump 37, and the discharge of the compressor pump 37 is coupled to the input of an oil separator/reservoir 38.

The recycling/recharging device 22 may also be provided with a low pressure cutoff switch 41 connected to the input of the oil separator solenoid 34 and a high pressure cutoff switch 42 connected to the output of the oil separator reservoir 38. The output of the oil separator/reservoir 38 is also connected to a vent line 44 via a vent solenoid valve 43. A process port of the compressor/pump 37 is connected through a solenoid valve 45 to a return port of the oil separator/reservoir 38.

The output of the condenser 40 is connected through a moisture indicator 46 and a liquid solenoid valve 47 to the input of the refrigerant recovery tank 50 through suitable anti-blowback valves. The input of the tank 50 is also connected through a purge solenoid valve 51 and an air filter 52 in a purge line, and is also connected to a purge transducer 53. The refrigerant recovery tank 50 has a liquid outlet coupled through a filter and suitable anti-blowback valves, and then through a charge solenoid valve 55 and a check valve 56 to the automotive connection point 30. The output of the oil separator 32 is connected through a filter bypass solenoid valve 58 to a vacuum conduit, the other end of which is normally connected to the manifold 36.

A vacuum pump 26 has a suction port and an exhaust port, and in order to install the vacuum pump 26 in the recycling/recharging device 22, a cap or plug 29 is removed from the suction port of the vacuum pump 26, the lower end of the vacuum conduit is disconnected from the manifold 36 and reconnected to the suction port of the vacuum pump 26, and the plug 29 is then installed on the port of the manifold 36 from which the vacuum line was just disconnected, resulting in the arrangement illustrated in FIG. 2. The discharge port of the vacuum pump 26 is vented to atmosphere.

Through use of the present refrigerant recycling/recharging system and methodology, refrigerant transferred from the source container into the refrigerant recovery tank of the recycling/recharging device is performed at a greater rate due to reducing the chilling of the source tank. Also refrigerant can be withdrawn from the source tank in either the vapor or liquid phase. Furthermore, as the pressure of the refrigerant is kept higher using the system and method described above, the compressor used to draw the refrigerant from the source tank does not have to work as hard, thereby increasing the life of the compressor.

The disclosed concepts may be practiced by employing conventional methodology and equipment. Accordingly, the details of such equipment and methodology are not set forth herein in detail. In the previous descriptions, numerous specific details are set forth, such as specific formulas, processes, techniques, etc., in order to provide a thorough understanding of the present invention. However, it should be recognized that the present invention may be practiced without resorting to the details specifically set forth.

Only an exemplary aspect of the present disclosure and but a few examples of its versatility are shown and described. It is to be understood that the present invention is capable of use in various other combinations and environments and is capable of changes or modifications within the scope of the inventive concept as expressed herein.

What is claimed is:

1. A refrigerant recovery/recycling system, comprising:
   a source container for storing refrigerant;
   a recovery/recycling device having a refrigerant recovery tank;
   a vaporizer disposed between and fluidly connected to the source container and the refrigerant recovery tank of the recover/recycling device.

2. The system according to claim 1, wherein the vaporizer is a thermal expansion valve.

3. The system according to claim 1, wherein the vaporizer is a regulator.

4. The system according to claim 1, wherein the vaporizer is a pulsed solenoid.

5. The system according to claim 1, wherein the vaporizer is an orifice.

6. The system according to claim 1, wherein the vaporizer is positioned within the recovery/recycling device.

7. The system according to claim 1, wherein the vaporizer is positioned away from the recovery/recycling device.

8. A method for charging a recovery/recycling device with refrigerant, comprising:
   transferring liquid refrigerant from a source container to a vaporizer separate from said source container;
   vaporizing the liquid refrigerant using the vaporizer;
   transferring the vaporized refrigerant from the vaporizer to a refrigerant recovery tank of the recovery/recycling device.

9. The method according to claim 8, wherein the vaporizer is a thermal expansion valve.

10. The method according to claim 8, wherein the vaporizer is a regulator.

11. The method according to claim 8, wherein the vaporizer is a pulsed solenoid.

12. The method according to claim 8, wherein the vaporizer is an orifice.

13. The system according to claim 8, wherein the vaporizer is positioned within the recovery/recycling device.

14. The system according to claim 8, wherein the vaporizer is positioned away from the recovery/recycling device.

* * * * *